United States Patent
Goudarzi

(10) Patent No.: US 9,727,181 B2
(45) Date of Patent: Aug. 8, 2017

(54) METHOD AND SYSTEM FOR LOW GROUND MASS CORRECTION

(71) Applicant: Synaptics Incorporated, San Jose, CA (US)

(72) Inventor: Katayoun Goudarzi, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 677 days.

(21) Appl. No.: 14/229,595

(22) Filed: Mar. 28, 2014

(65) Prior Publication Data

US 2015/0277619 A1 Oct. 1, 2015

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
CPC ............................... G06F 2/044; G06F 3/0418
See application file for complete search history.

(56) References Cited

U.S. PATENT DOCUMENTS

| | | |
|---|---|---|
| 5,945,980 A | 8/1999 | Moissev et al. |
| 8,054,300 B2 | 11/2011 | Bernstein |
| 2008/0042660 A1 * | 2/2008 | Ely ............... G01R 27/2605 324/678 |
| 2008/0157782 A1 | 7/2008 | Krah |
| 2008/0158183 A1 | 7/2008 | Hotelling et al. |
| 2009/0284495 A1 | 11/2009 | Geaghan et al. |
| 2010/0001973 A1 | 1/2010 | Hotelling et al. |
| 2010/0060608 A1 | 3/2010 | Yousefpor |
| 2010/0164889 A1 | 7/2010 | Hristov et al. |
| 2010/0245286 A1 | 9/2010 | Parker |
| 2010/0292945 A1 * | 11/2010 | Reynolds ............ G06F 3/044 702/65 |
| 2011/0006832 A1 | 1/2011 | Land et al. |
| 2011/0012840 A1 * | 1/2011 | Hotelling ............ G06F 3/0418 345/173 |
| 2011/0015889 A1 * | 1/2011 | Land ................... G06F 3/0418 702/104 |
| 2011/0025629 A1 | 2/2011 | Grivna et al. |
| 2011/0061949 A1 | 3/2011 | Krah et al. |
| 2011/0074725 A1 * | 3/2011 | Westerman .......... G06F 3/0418 345/174 |
| 2012/0043971 A1 | 2/2012 | Maharyta |
| 2012/0081335 A1 | 4/2012 | Land et al. |

(Continued)

*Primary Examiner* — Son Le
*Assistant Examiner* — Adam Clarke
(74) *Attorney, Agent, or Firm* — Osha Liang LLP

(57) ABSTRACT

A processing system for an input device includes a sensor module coupled to first sensor electrodes and second sensor electrodes. The sensor module includes sensor circuitry and is configured to acquire mutual capacitive measurements between the first sensor electrodes and the second sensor electrodes, and acquire absolute capacitive measurements of the first sensor electrodes and the second sensor electrodes. The processing system further includes a determination module configured to determine a projection from the mutual capacitive measurements and a profile from the absolute capacitive measurements, and determine a low ground mass correction factor based on a good ground value, the projection, and the profile.

18 Claims, 8 Drawing Sheets

(56) References Cited

U.S. PATENT DOCUMENTS

2013/0069905 A1* 3/2013 Krah .................... G06F 3/044
   345/174
2013/0147752 A1* 6/2013 Simmons ............. G06F 3/044
   345/174
2013/0173211 A1   7/2013 Hoch et al.

* cited by examiner

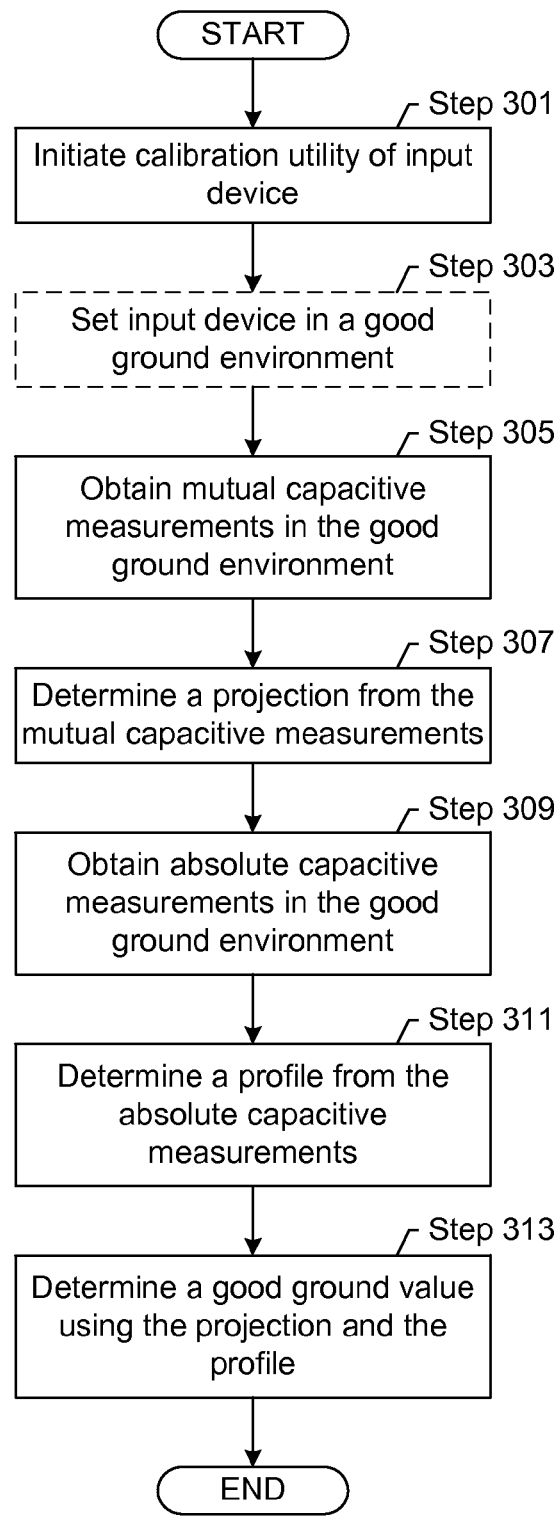
FIG. 3.1

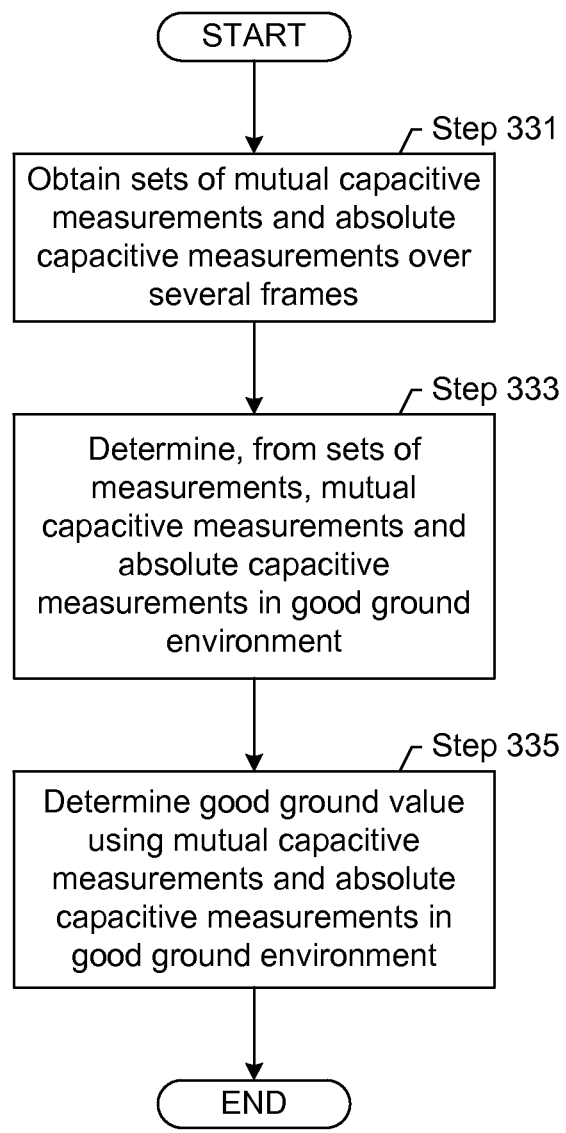
FIG. 3.2

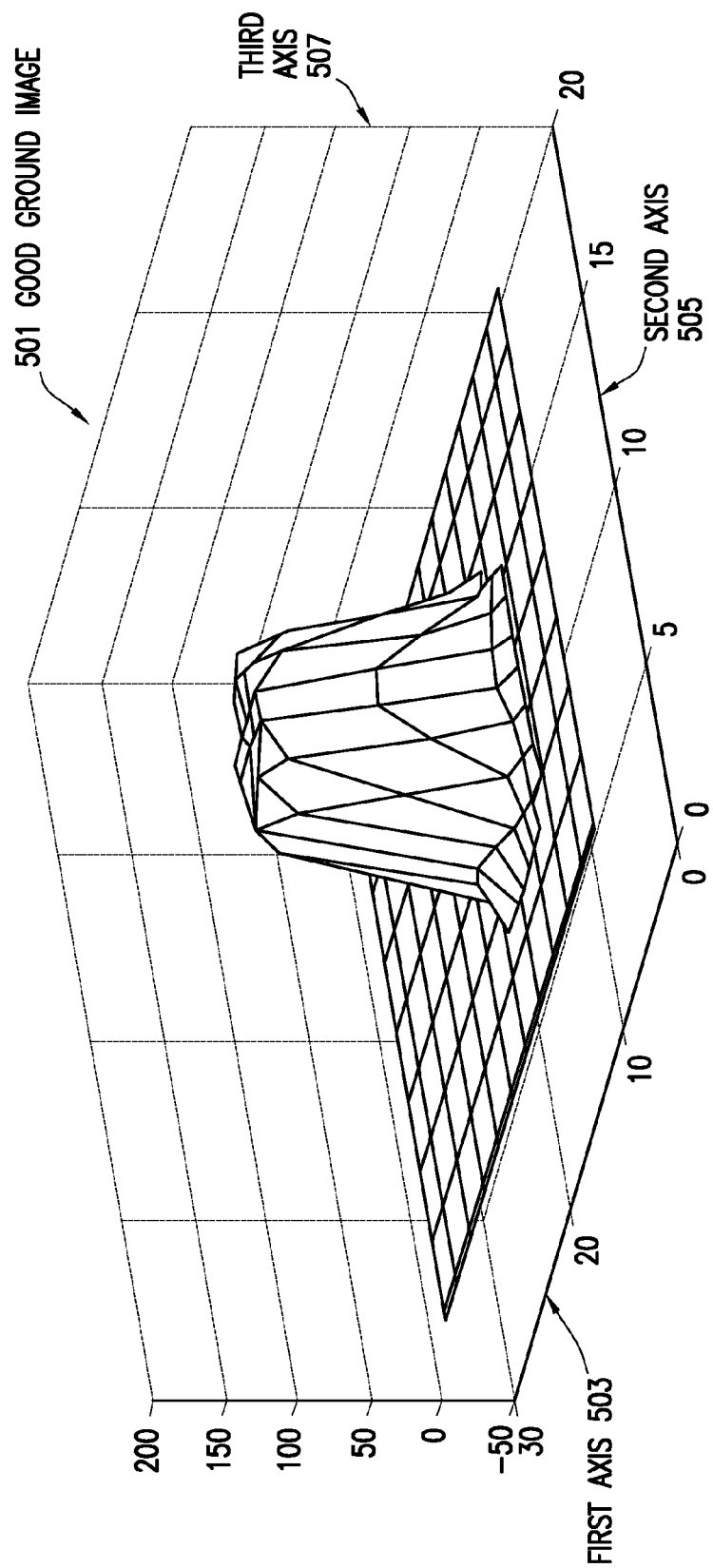
FIG. 5.1

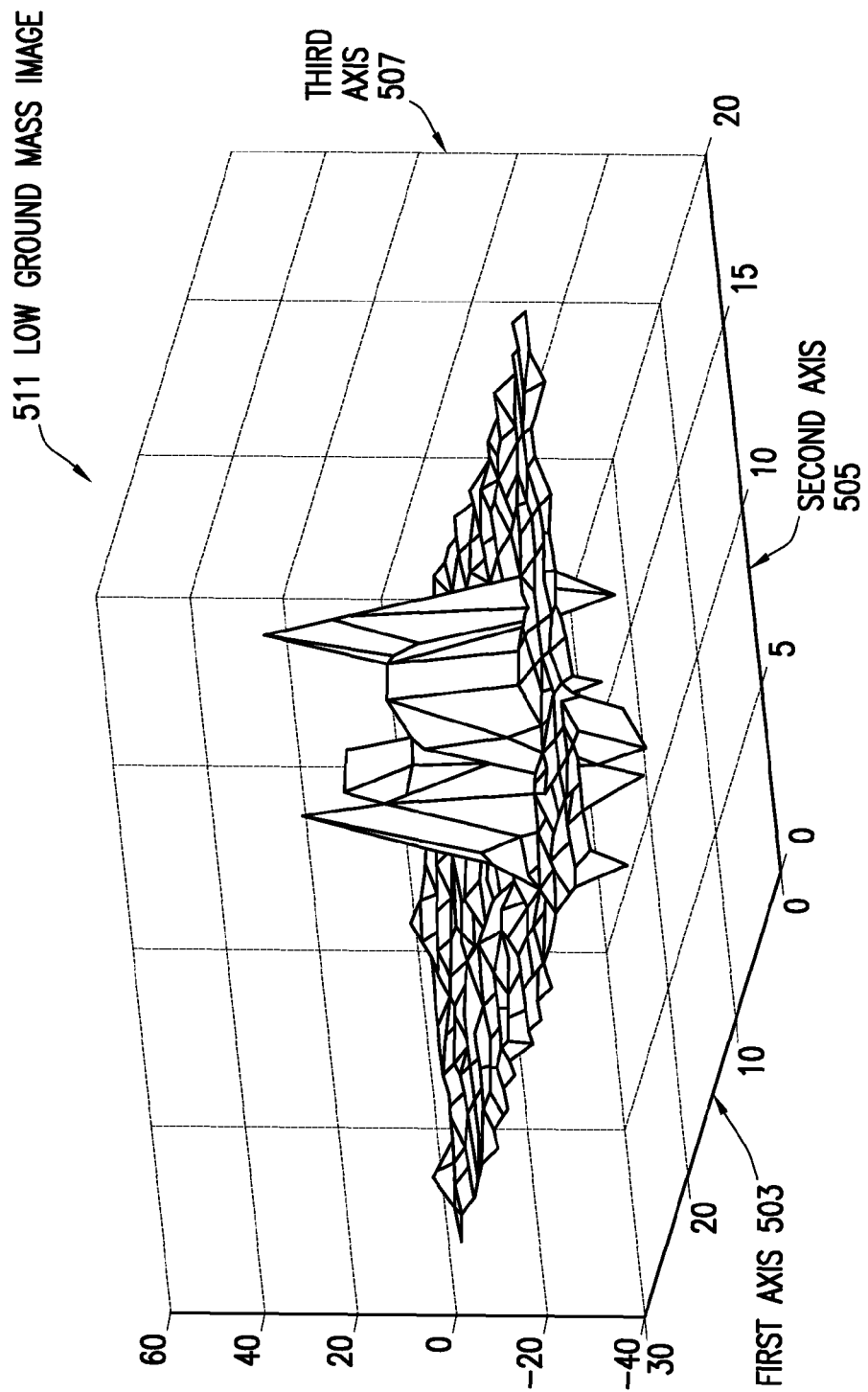
FIG. 5.2

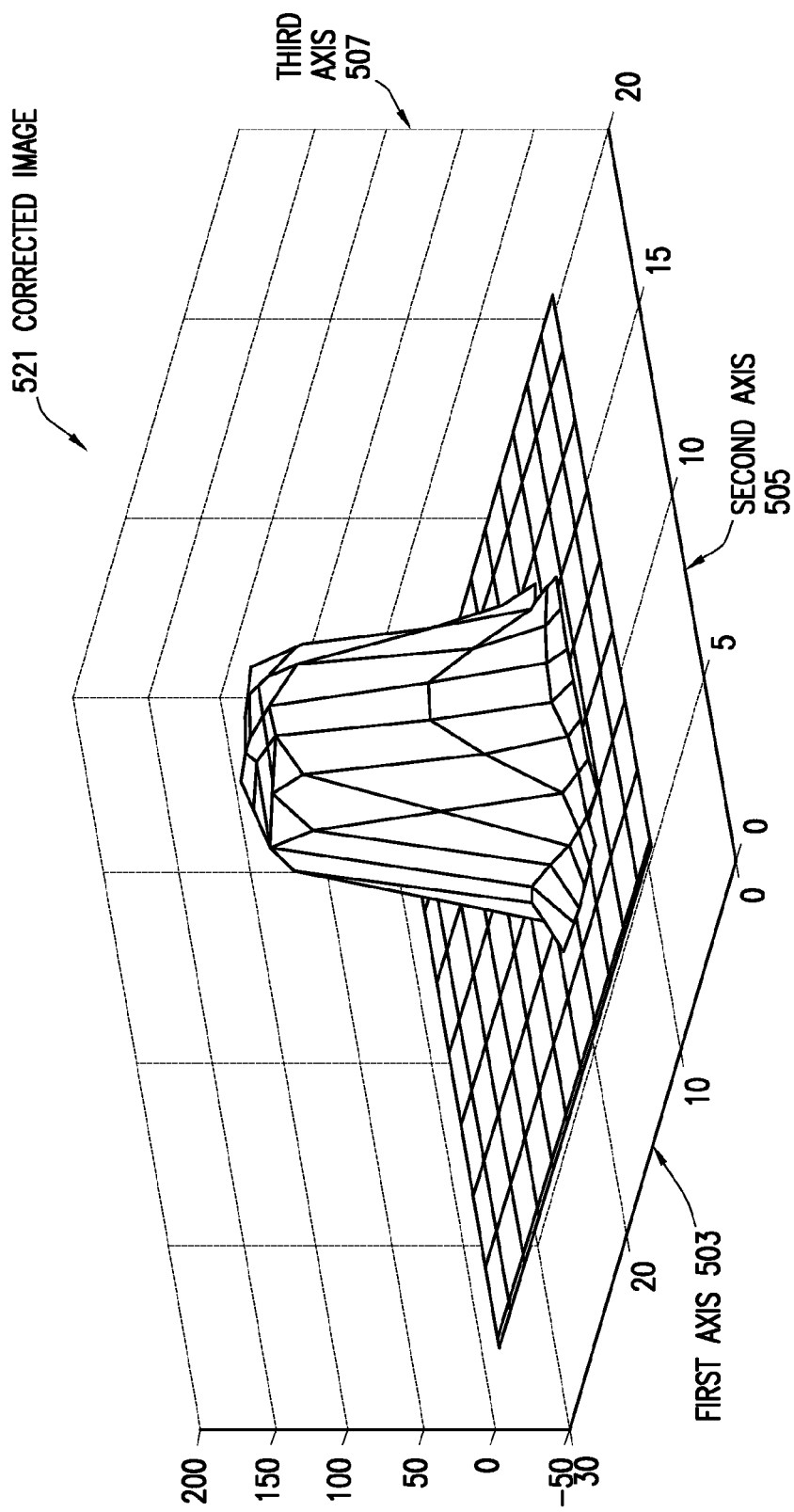
FIG. 5.3

METHOD AND SYSTEM FOR LOW GROUND MASS CORRECTION

FIELD OF THE INVENTION

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments of the invention relate to a processing system for an input device. The processing system includes a sensor module coupled to first sensor electrodes and second sensor electrodes. The sensor module includes sensor circuitry and is configured to acquire mutual capacitive measurements between the first sensor electrodes and the second sensor electrodes, and acquire absolute capacitive measurements of the first sensor electrodes and the second sensor electrodes. The processing system further includes a determination module configured to determine a projection from the mutual capacitive measurements and a profile from the absolute capacitive measurements, and determine a low ground mass correction factor based on a good ground value, the projection, and the profile.

In general, in one aspect, embodiments of the invention relate to an input device that includes first sensor electrodes and second sensor electrodes configured to sense input objects in a sensing region of the input device, and a processing system. The processing system is configured to acquire mutual capacitive measurements between the first sensor electrodes and the second sensor electrodes, acquire absolute capacitive measurements of the first sensor electrodes and the second sensor electrodes, determine a projection from the mutual capacitive measurements and a profile from the absolute capacitive measurements, and determine a low ground mass correction factor based on a good ground value, the projection, and the profile.

In general, in one aspect, embodiments of the invention relate to a method for capacitive sensing of an input device. The method includes acquiring mutual capacitive measurements between first sensor electrodes and second sensor electrodes, and acquiring absolute capacitive measurements of the first sensor electrodes and the second sensor electrodes. The method further includes determining a projection from the mutual capacitive measurements and a profile from the absolute capacitive measurements, determining a low ground mass correction factor based on a good ground value, the projection, and the profile, and determining positional information for an input object based on the mutual capacitive measurements and the low ground mass correction coefficient. The method further includes reporting the positional information.

Other aspects of the invention will be apparent from the following description and the appended claims.

BRIEF DESCRIPTION OF DRAWINGS

FIGS. 2, 3.1, 3.2, and 4 show flowcharts in accordance with one or more embodiments of the invention.

FIGS. 5.1, 5.2, and 5.3 show an example in accordance with one or more embodiments of the invention.

DETAILED DESCRIPTION

Figure 1:
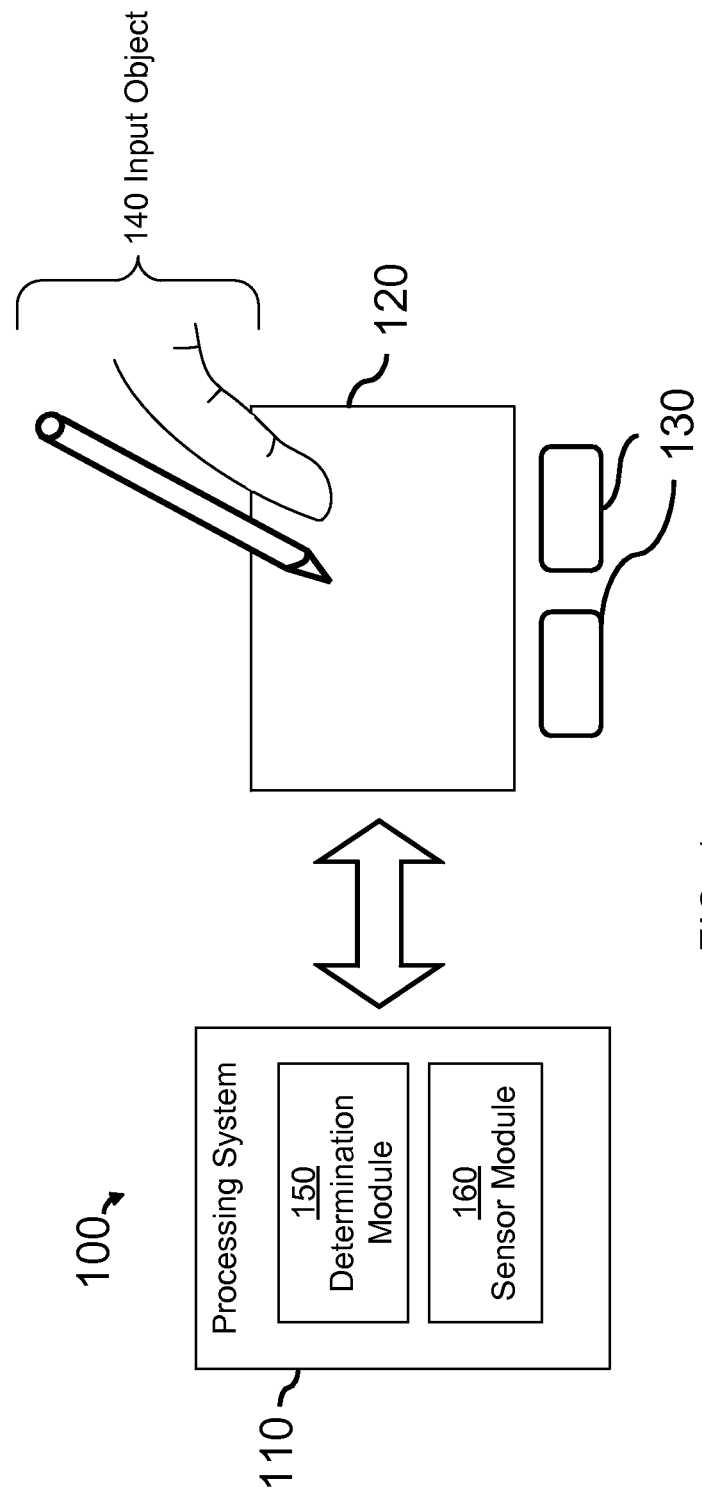
FIG. 1 shows a schematic diagram of a system in accordance with one or more embodiments of the invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed the second element in an ordering of elements.

In general, embodiments of the invention are directed toward measuring and correcting for low ground mass. Specifically, low ground mass occurs when a capacitance input device does not have sufficient ground. For example, an input device may not have sufficient ground when the input device is on a non-conductive insulated surface and is not connected to the ground. One or more embodiments of the invention perform a calibration of the input device to obtain a good ground value between mutual capacitive and absolute capacitive measurements. After calibration, mutual capacitive measurements and absolute capacitive measurements are acquired during use of the input device. A low ground mass correction factor is calculated based on the good ground comparison and mutual capacitive measurements and absolute capacitive measurements acquired during use of the input device. The low ground mass correction factor may be applied to the mutual capacitive and/or absolute capacitive measurements acquired during use to correct for low ground mass.

In one or more embodiments of the invention, the calibration is performed to reflect the input device in a good ground environment. For example, the values used for calibration may be obtained while the input device is in a good ground environment. By way of another example, the values used for calibration may be an estimate of values of the input device in the good ground environment. In general, the quality of a ground environment, such as whether the input device is in a good ground environment or low ground mass environment, is described on a scale. One mechanism to define the quality of the ground is based on the following equation.

$$C_{LGM}^{(i,k)} = \frac{C_{FTx_i} C_{FRx_k}}{C_{FS} + C_{GRD}} \qquad (Eq. 1)$$

In Eq. 1, $C_{LGM}$ is low ground mass coefficient, $C_{FS}$ is capacitance between the input object and all sensor electrodes, $C_{FTX}$ is capacitance between input object and transmitter electrodes, $C_{FRX}$ is the capacitance between input object and receiver electrodes, and $C_{GRD}$ is the free space capacitive coupling in series between the sensor device and the user.

In various other embodiments, the low ground correction coefficient may be based at least in part on a probability that the measured capacitance of capacitive pixels is indicative of a input object touching or proximate the capacitive pixel. Further, in other embodiments, the low ground correction coefficient may be based at least in part on observed negative pixel values. In such embodiments, the low ground correction coefficient may be calculated using quantization methods to identify the largest negative pixel value or a most commonly occurring negative pixel values.

In one or more embodiments of the invention, the value of $C_{LGM}$ depends on the deltaCt term. In some embodiments, if $$SNR_{LGM} = \frac{deltaCt}{C_{LGM}}, \qquad (Eq. 2)$$

where $SNR_{LGM} > 1.5$ the input device may be determined to be in a good ground environment. In one or more embodiments of the invention, the deltaCt is the change in mutual that is measured. In other words, deltaCt is the measured value obtained during the scanning performed for mutual capacitive sensing. The constraint for being in a good ground environment of $SNR_{LGM}$ being greater than 1.5 is an approximate constraint and may be different without departing from the scope of the invention. However, if $SNR_{LGM}<1$, then the input object is in a low ground mass environment. Conversely, if $SNR_{LGM}>2.5$ and $<4$, than low ground mass is determined to be present, but the input object may still be determined to be in a good ground environment in some embodiments of the invention. As $SNR_{LGM}$ approaches infinity, which is achieved if $C_{GRD}$ approaches infinity, low ground mass is determined not to be present. If $C_{GRD}$ is greater than a certain threshold value (e.g., 50-100 pF), then. $SNR_{LGM}$ is greater than 2.5 to 4.

In some embodiments, the quality of the ground may be defined as follows. If $SNR_{LGM}<1.5$, the input device is determined to be in a poorly grounded low ground mass environment. If $1.5<SNR_{LGM}<2.5$, then the input device is determined to be in a low ground mass environment that is still inferior, but not as bad as if $SNR_{LGM}<1.5$. If $SNR_{LGM}>2.5-4$, the input device may be determined to be in a good ground environment even when low ground mass is determined to exist. If $SNR_{LGM}>4$, then the input device is determined to be in a good ground environment.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the Specification, the singular form of input object is used. Although the singular form is used, multiple input objects exist in the sensing region (120). Further, which particular input objects are in the sensing region may change over the course of the gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

Sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a trans capacitance sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). Sensor electrodes may be dedicated transmitters or receivers, or may be configured to both transmit and receive. Measurements acquired using mutual capacitance sensing methods may be referred to as mutual capacitive measurements.

In various embodiments, processing system (110) is configured to determine changes in absolute capacitance of a first and second plurality of sensor electrodes and mutual capacitances between the first and second plurality of sensor electrodes. Processing system (110) may be configured to drive the first and second plurality of sensor electrodes to determine changes in absolute capacitance during a first time period and changes in mutual capacitance during a second time period, where the first and second time periods do not overlap in time. Further, the processing system (110) may be configured to determine changes in absolute capacitance a first time period and changes in mutual capacitance during a second time period, where the first and second time periods at least partially overlap in time. In various embodiments, the first and second time periods may completely overlap in time such that the absolute measurements and mutual capacitive measurements are acquired simultaneously. In other embodiments, processing system (110) may be configured to drive the first plurality of sensor electrodes determine changes in absolute capacitance during a first time period, the second plurality of sensor electrodes determine changes in absolute capacitance during a second time period and changes in mutual capacitance during a third time period, where at least two of the time periods at least partially overlap.

Some optical techniques utilize optical sensing elements (e.g., optical transmitters and optical receivers). Such optical transmitters transmit optical transmitter signals. The optical receivers include functionality to receive resulting signals from the optical transmitter signals. A resulting signal may include effect(s) corresponding to one or more transmitter signals, one or more input objects (140) in the sensing region, and/or to one or more sources of environmental interference. For example, the optical transmitters may correspond to a light emitting diode (LED), organic LED (OLED), light bulb, or other optical transmitting component. In one or more embodiments, the optical transmitter signals are transmitted on the infrared spectrum.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes). In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to sensing element(s) of input device (100), and one or more components elsewhere. For example, the input device (100) may be a peripheral coupled to a desktop computer, and the processing system (110) may include software configured to run on a central processing unit of the desktop computer and one or more ICs (perhaps with associated firmware) separate from the central processing unit. As another example, the input device (100) may be physically integrated in a phone, and the processing system (110) may include circuits and firmware that are part of a main processor of the phone. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and perform other operations.

The sensor module (160) may include functionality to drive the sensing elements to transmit transmitter signals and receive resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures such as mode changing gestures, and mode changing modules for changing operation modes.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 2:
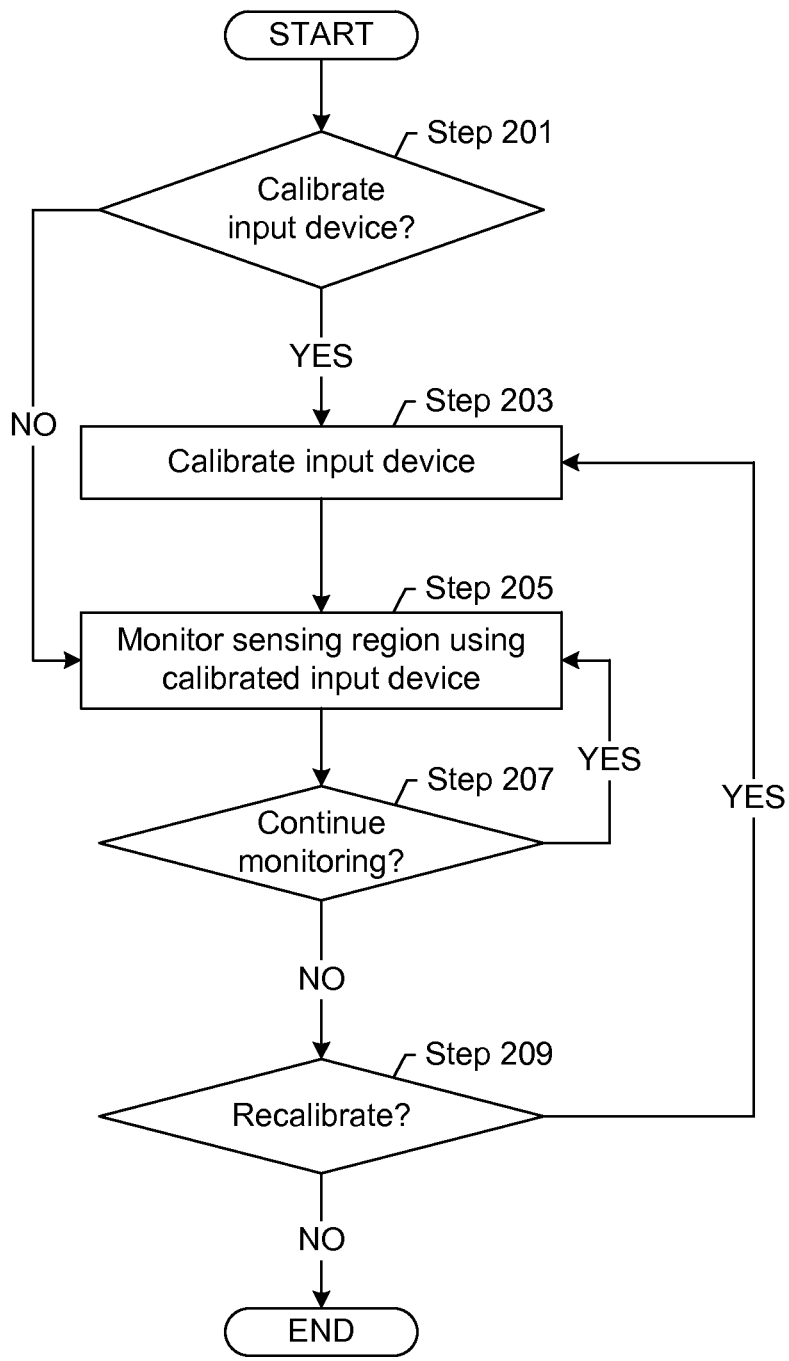

FIGS. 2, 3.1, 3.2, and 4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart providing an overview for managing low ground mass in accordance with one or more embodiments of the invention. In Step 201, a determination is made whether to calibrate the input device. In one or more embodiments of the invention, the determination to calibrate the input device may be performed at virtually any time. For example, a determination may be based on the operation of the input device being an initial operation of the input device. The initial operation of the input device may be the first time that power is provided to the input device, such as by a manufacturer, distributor, retailer, end user, at another first operation, or a combination thereof. For example, when a manufacturer powers up an input device for testing, the manufacturer may execute a calibration utility to configure the input device for low ground mass detection. By way of another example, as part of a user or retailer loading a user's profile onto the input device, the calibration utility may automatically execute to configure the input device for low ground mass detection.

The calibration may alternatively or additionally be triggered by other mechanisms. For example, one or more embodiments may wait for calibration until requested by a user or another application. By way of a more specific example, a user may determine that the input device is not responding correctly in low ground mass situations and initiate a calibration utility program to calibrate the input device. By way of another example, an application may determine that the positional information from the input device appears incorrect and trigger the calibration utility to calibrate the input device.

By way of another example alternative trigger, the calibration of the input device may be triggered by the input device determining that the input device is in a good ground environment. For example, the input device may detect that a user is holding the phone, thereby indicating a good ground environment. In such an example, calibration may be triggered based on the detection.

If a determination is made to calibrate the input device, then the input device is calibrated in a good ground environment in Step 203 in accordance with one or more embodiments of the invention. Calibrating the input device is discussed below and in FIG. 3 in accordance with one or more embodiments of the invention.

Continuing with FIG. 2, using the calibrated input device, the sensing region is monitored in Step 205 in accordance with one or more embodiments of the invention. Specifically, information obtained from the calibration is used to monitor the input device and correct measurements in low ground mass environments. Monitoring the input device is discussed below and in FIG. 4 in accordance with one or more embodiments of the invention.

Continuing with FIG. 2, in Step 207, a determination is made whether to continue monitoring the input device in accordance with one or more embodiments of the invention. In one or more embodiments of the invention, the input device is continuously monitored until powered down or otherwise requested to stop the monitoring. Other reasons for ceasing the monitoring may exist without departing from the scope of the invention.

In Step 209, a determination is made whether to recalibrate the input device in accordance with one or more embodiments of the invention. Recalibration may occur, for example, when the input device determines that the input device is in a good ground environment. For example, the input device may detect that a user is holding the input device and thus, trigger a recalibration of the input device. As another example, recalibration may be triggered by the user or by an application. By way of a more specific example, a user may determine that the input device is not responding correctly in low ground mass situations and initiate a calibration utility program to calibrate the input device. By way of another example, an application may determine that the positional information from the input device appears incorrect and trigger the calibration utility to calibrate the input device. A variety of factors may trigger the calibration of the input device. For example, the factor that the input device is in a good ground environment coupled with the length of time since the last calibration may trigger calibration of the input device.

If a determination is made to recalibrate the input device, then the input device is calibrated in Step 203 in accordance with one or more embodiments of the invention.

Although FIG. 2 shows determining whether to recalibrate after determining whether to continue monitoring, the determination to recalibrate and continue monitoring may be performed in any order, simultaneously, and/or repetitively. Further, in one or more embodiments of the invention, the input device continuously and/or continually scans the sensing region for one or more input objects until a trigger is received to stop scanning the sensing region.

FIG. 3.1 shows a flowchart for calibrating the input device for low ground mass environments in accordance with one or more embodiments of the invention. In Step 301, a calibration utility of the input device is initiated in accordance with one or more embodiments of the invention. In accordance with one or more embodiments of the invention, the calibration utility may execute when triggered, as discussed above, or continuously execute as part of a background process. In some embodiments of the invention, the calibration utility detects when the input device is in a good ground environment and calibrates without user involvement while the input device is in the good ground environment. If the calibration utility detects that the input device is in a good ground environment, then Step 303 may be ignored.

In some embodiments of the invention, the calibration utility may include a user interface that guides the user through calibrating the input device. For example, the calibration utility may instruct the user to hold the input device in a certain manner, place the input device on a table or floor having a good ground, or perform other action to put the input device in a good ground environment. The calibration utility may further include a selection box or other user interface tool that allows the user to inform the calibration utility when the input device is in a good ground environment.

In Step 303, the input device is set in a good ground environment in accordance with one or more embodiments of the invention. In one or more embodiments of the invention, if the input device is not already in a good ground environment, then the input device is placed in a good ground environment. As discussed above, the calibration utility may instruct a user as to how to place the input device in a good ground environment.

In Step 305, mutual capacitive measurements in the good ground environment are obtained in accordance with one or more embodiments of the invention. As discussed above, the mutual capacitance sensing method obtains a measurement for each pixel. Specifically, in mutual capacitance sensing, a processing system drives and receives with sensor electrodes to obtain a measurements of changes in mutual capacitance between the sensor electrodes. In one or more embodiments, the measurements may be represented as a capacitive image having multiple capacitive pixels. The areas of localized capacitive sensing of capacitive couplings may be termed "capacitive pixels." In one embodiment, processing system is configured to drive a first plurality of sensor electrodes with a transmitter signals (i.e., transmitter electrodes) and receive a resulting signals with a second plurality of sensor electrodes (i.e., receiver electrodes). The first plurality of sensor electrodes may be disposed along a first axis and the second plurality of sensor electrode may be disposed along a second axis. The first axis and second axis may be orthogonal or non-orthogonal to each other. In other embodiments, the first plurality of sensor electrodes and the second plurality of sensor electrode may be disposed along a same axis.

In Step 307, a projection from the mutual capacitive measurements is determined in accordance with one or more embodiments of the invention. The projection may be along a each axis. Further, multiple projections may be determined. For example, one projection may be along a first axis while another projection may be determined along a second axis.

Determining the projection along the first axis includes summing the capacitive measurements of at least a subset of the mutual capacitive measurements along the length of each sensor electrode disposed along that axis. The at least the subset of mutual capacitive measurements may be all pixels only a portion of the mutual capacitive measurements. The result of summing is a single capacitive measurement corresponding to each sensor electrode along the first axis. In one or more embodiments of the invention, the same subset mutual capacitive measurements are summed for each sensor electrode.

Determining the projection along the second axis includes summing the capacitive measurement of at least a subset of the mutual capacitive measurements along the length of each sensor electrode disposed along the second axis. The at least the subset of mutual capacitive measurements may be all pixels in the only a portion of the mutual capacitive measurements. The result of summing is a single capacitive measurement corresponding to each sensor electrode along the second axis. In one or more embodiments of the invention, the same subset mutual capacitive measurements are summed for each sensor electrode.

In Step 309, absolute capacitive measurements in the good ground environment are obtained in accordance with one or more embodiments of the invention. By way of background, in sensor electrodes that transmit and receive signals are located on both axis of the sensing region. To take a measurement along a first axis, the sensor electrodes on the second axis transmit a transmitter signal, potentially at the same time, and the resulting signal is received on the first axis. The result of the transmission is a single capacitive measurement corresponding to each sensor electrode depending on the axis. The capacitive measurements may be obtained for both axis or for a single axis. In one or more embodiments of the invention, the axis for which the capacitive measurements are obtained is along the same axis or axes for which the projection is obtained in Step 307.

In Step 311, a profile is determined from the absolute capacitive measurements in accordance with one or more embodiments of the invention. Specifically, in one or more embodiments of the invention, the profile is the set of capacitive measurements along an axis. In one or more embodiments of the invention, a profile is obtained for each axis in which capacitive measurements are acquired.

In one or more embodiments of the invention, Steps 305 and 309 are performed during the same sensing frame. Each sensing frame is time window during which a single capture of the status of the sensing region with respect to the presence any input objects is performed. During a sensing frame, any and all input objects may be approximated as being stationary. In other words, the time window of the sensing frame is so short as to be effectively instantaneous to a human operator. In one or more embodiments of the invention, at the end of the frame, a report may be transmitted to other components of the processing system, input device, host system, or other device, or combination thereof. Each report includes positional information (discussed above with reference to FIG. 1) regarding any input objects in the sensing region.

Further, Steps 305-311 may be repeated for multiple frames to obtain multiple frames of data. In one or more embodiments of the invention, the projections may be averaged over the multiple frames and, similarly, the profiles may be averaged over the multiple frames to obtain an average projection and an average profile. The average projection and average profile may be used in Step 313 (described below).

In Step 313, a good ground value using the projection and the profile is determined in accordance with one or more embodiments of the invention. In one or more embodiments of the invention, the projection is on the same axis as the profile. The good ground value provides a relationship between the projection and the profile. In some embodiments, the good ground value is the projection and the profile in a good ground environment. In other embodiments, the good ground value is a calculated value using the projection and the profile. Further, multiple good ground values may exist. For example, the good ground value may be projections and profiles along multiple axes and/or for each electrode along one or both axis. By way of another example, the good ground value may be a calculated value along multiple axes and/or for each electrode along one or both axis. For example, a single, individual good ground value may exist for each sensor electrode of the input device. Thus, for n sensor electrodes of a first plurality and m sensor electrodes of a second plurality, then m+n good ground values may exist. As another example, the good ground value may be a single value per axis, such as the result of a calculation for each sensor electrode on the axis that is then averaged across all sensor electrodes on an axis.

FIG. 3.2 shows another flowchart for performing calibration of the input device in accordance with one or more embodiments of the invention. In FIG. 3.2, the calibration is performed over a span of time while the input device is being used. In other words, the input device may be in a low ground mass environment or be in a good ground mass environment when sets of measurements for calibration are obtained. The sets of measurements used for the calibration may or may not also be used for detecting input objects in the sensing region and obtaining positional information during use of the input device. In some embodiments, to use a particular set of measurements, the input device must satisfy only a minimum threshold for being in a good ground mass environment even though some low ground mass may exist. In other embodiments, no satisfaction of a threshold is required.

Turning to FIG. 3.2, in Step 331, sets of mutual capacitive measurements and absolute capacitive measurements are obtained over several frames. Specifically, for each of several frames, a mutual capacitive measurement is obtained and an absolute capacitive measurement is obtained to form a set of measurements. Obtaining the mutual capacitive measurement and the absolute capacitive measurement may be performed as discussed above in FIG. 3.1. Further, the sets of frames for which the mutual capacitive measurements and absolute capacitive measurements are obtained for calibration purposes may be consecutive or may not be consecutive. For example, a set of measurements may be obtained for calibration every pre-specified number of frames, every minute, every hour, every day, periodically at any interval or randomly.

In Step 333, from the sets of measurements, mutual capacitive measurements and absolute capacitive measurements in good ground environment are determined in accordance with one or more embodiments of the invention. Specifically, the sets of measurements may be used to estimate a single set of measurements for good ground mass.

In Step 335, one or more good ground values are determined using mutual capacitive measurements and absolute capacitive measurements in good ground environment in accordance with one or more embodiments of the invention. Determining one or more good ground values may be performed as discussed above in Step 313.

Although FIG. 3.2 shows performing Step 333 and 335, Step 333 may be omitted. In such a scenario, the good ground values may be maintained as a running estimate. In such a scenario, the calibration may be ongoing throughout use of the input device and may extend through a span of time.

Figure 4:
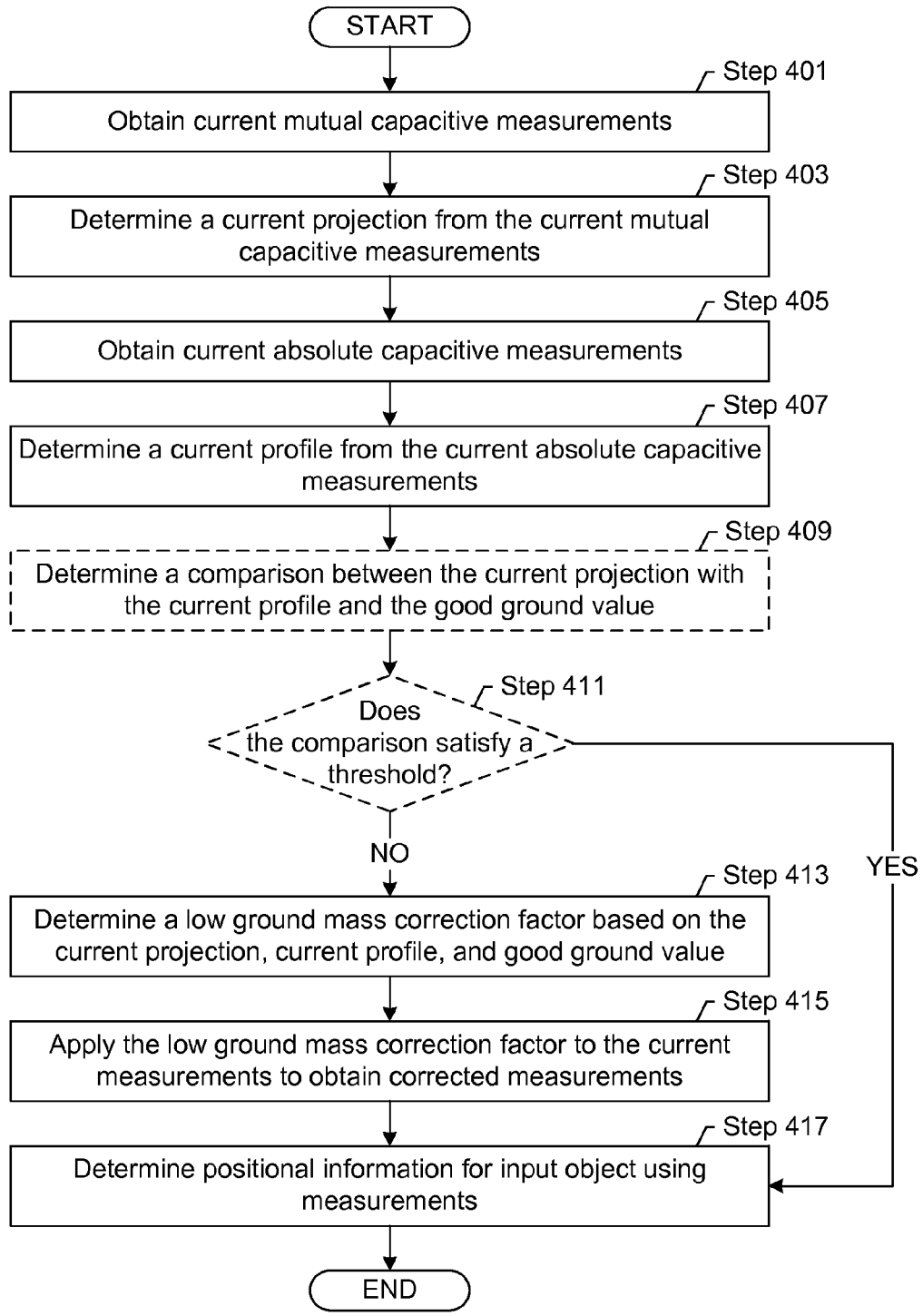

Using the good ground values, one or more embodiments of the invention may correct for low ground mass during monitoring and use of the input device in accordance with one or more embodiments of the invention. FIG. 4 shows a flowchart for monitoring the input device in accordance with one or more embodiments of the invention.

In Step 401, current mutual capacitive measurements in the current ground environment of the input device are obtained in accordance with one or more embodiments of the invention. As discussed above, the mutual capacitance sensing method obtains a measurement for each pixel.

In Step 403, a current projection from the current mutual capacitive measurements is determined in accordance with one or more embodiments of the invention. The projection may be along a first axis or a second axis. Further, multiple projections may be determined. For example, one projection may be along the first axis while another projection may be determined along the second axis.

In Step 405, current absolute capacitive measurements in the current ground environment of the input device are obtained in accordance with one or more embodiments of the invention. The current capacitive measurements may be obtained for both axis or for a single axis. In one or more embodiments of the invention, the axis for which the current absolute capacitive measurements are obtained is along the same axis or axes for which the projection is obtained in Step 403.

In Step 407, a current profile is determined from the current absolute capacitive measurements in accordance with one or more embodiments of the invention. Specifically, a profile is obtained for each axis in which the current absolute capacitive measurements are acquired.

In one or more embodiments of the invention, Steps 401 and 405 are performed during the same sensing frame. Further Steps 401, 403, 405, and 407 of FIG. 4 may be performed in a same or similar manner as discussed above with reference to Step 305, 307, 309, and 311, respectively, of FIG. 3.1.

Continuing with FIG. 4, in Step 409, a comparison is performed between the current projection with the current profile and the good ground value. In particular, the comparison determines whether the input device is in a low ground mass environment for which correction should be performed. In one or more embodiments of the invention, determining the comparison includes obtaining a current ground value using the same or similar method to obtaining the good ground value discussed above and in Step 313. For example, if the good ground value is the projection and the profile is in the good ground environment, then the current projection and current profile are used directly as current ground values in accordance with one or more embodiments of the invention. If the good ground value is a calculated value, then the current ground value is also a calculated value in accordance with one or more embodiments of the invention. Additionally, in one or more embodiments of the invention, obtaining the comparison includes identifying a difference between the current ground value and the good ground value. Other techniques for obtaining a comparison may be performed without departing from the scope of the invention.

In Step 411, a determination is made whether the comparison satisfies a threshold. Specifically, a determination is made whether the comparison indicates that the input device is in a low ground mass environment. If the comparison satisfies a threshold, then the input device is determined not to be in a low ground mass environment. In such a scenario, the method proceeds to Step 417. If the comparison does not satisfy a threshold, then the method proceeds to Step 413 to correct the measurements. In one or more embodiments of the invention, Steps 409 and 411 are expressly indicated as optional in that calculations may be applied to all measurements obtained during use to correct any low ground mass in the measurements. For example, when the input device is in a good ground environment rather than a low ground mass environment, the calculations may apply a zero or miniscule value correction to the measurements. Although FIG. 4 shows only Steps 409 and 411 as optional, other steps may be optional without departing from the scope of the invention.

Continuing with FIG. 4, in Step 413, a low ground mass correction factor is determined based on the current projection, the current profile, and the good ground value. In one or more embodiments of the invention, one or more calculations may be performed to obtain the low ground mass correction factor. In one or more embodiments of the invention, a separate, individual low ground mass correction factor may exist for each pixel in the mutual capacitive image and/or for each sensor electrode in the profile(s).

In Step 415, the low ground mass correction factor is applied to the current measurements to obtain corrected measurements in accordance with one or more embodiments of the invention. In particular, the low ground mass correction factor is a factor that is mathematically applied to the current measurements (e.g., current mutual capacitive measurements or current absolute capacitive measurements) to correct for low ground mass. Mathematically applying the low ground mass correction factor to the current measurements may be performed using addition, multiplication, etc. of the low ground mass correction factor to each of the current measurements.

In Step 417, positional information is determined for any input object in the sensing region using the measurements. If comparison in Step 411 does not satisfy the threshold, then the corrected measurements are used. If the comparison in Step 411 does satisfying the threshold, then the original current measurements are used in accordance with one or more embodiments of the invention. In one or more embodiments of the invention, the measurements may be mutual capacitive measurements, absolute capacitive measurements, other measurements, or a combination thereof.

Determining positional information using the measurements may include, for example, adjusting the measurements for the baseline capacitance (e.g., accounting for background capacitance of the input device), estimation of noise, and any other interference to identifying any input objects. Using the adjusted measurements, positional information is identified for any input objects in the sensing region and positional information.

The resulting positional information may be added to a report and, the report may be transmitted to other components of the processing system, input device, host system, or other device, or combination thereof. Each report includes positional information (discussed above with reference to FIG. 1) regarding any input objects in the sensing region. Based on the positional information indicating the presence and location of one or more input objects or lack thereof, the input device and/or host system may perform a corresponding action (e.g., move a cursor, close or open an application, select or deselect an object, zoom in or zoom out, transmit information, etc.).

In one or more embodiments of the invention, if the good ground value is a calculated value, the good ground value for a sensor electrode may be calculated based on the projection of the mutual capacitance measurements along that sensor electrode and the delta absolute capacitance measurement along that sensor electrode. In other words, the projection of the mutual capacitances is a summation of the good ground mutual capacitances measured between the sensor electrodes and all other sensor electrodes capacitively coupled to that sensor electrode. The good ground value may be a value that is calculated from a comparison of the projection of the mutual capacitance measurements along a sensor electrode and the delta absolute capacitance measurement along that sensor electrode of the projection of mutual capacitances. A comparison may include dividing the projection by the absolute capacitance, multiplying the values, subtracting one from the other, adding one to the other, or performing other mathematical function to compare the two values. A good ground value may be calculated for each sensor electrode. For example, in a sensing device including multiple transmitter electrodes and receiver electrodes, a good ground value may be determined for each transmitter electrode and each receiver electrode.

Rather than calculating a separate good ground value corresponding to each sensor electrode, in some embodiments, separate good ground values may be calculated for a subset of the sensor electrodes by performing some form of averaging for the good ground value for each sensor electrode in the subset. Alternatively or additionally, in some embodiments, a single good ground value for each sensor electrode of a particular set may be calculated by performing some form of averaging for the good ground value across all sensor electrodes of that set.

Using the above good ground values, a low ground mass correction factor may be calculated based on a comparison of the projections of the measured mutual capacitances, measured absolute capacitances and the good ground values. For an input device having sensor electrodes disposed along a first set of sensor electrodes disposed along a first axis and a second set of sensor electrodes disposed along a second axis, the low ground mass correction factor may be calculated based on comparisons of the projected measured mutual capacitances along a first sensor electrode of the first set, the measured absolute capacitance of that sensor electrode, a good ground value, total measured absolute capacitances for all sensor electrodes and the total absolute capacitances for the first set of sensor electrodes. In various embodiments, a low ground mass correction factor may include low ground correction factors for each sensor electrode.

In one or more embodiments of the invention, the low ground mass correction factor may be calculated by averaging the ratios of the current measurement projections to the current absolute measurements to obtain a resulting average. The resulting average may be compared to the good ground value to obtain the low ground mass correction factor. For example, the difference between the good ground value and the resulting average may be the low ground mass correction factor. Further, in some embodiments, a scaling factor may be applied, such as through multiplication, to the resulting difference to obtain the low ground mass correction factor. The scaling factor may be determined using empirical analysis.

Using the low ground mass correction factor, a corrected mutual capacitive image may be calculated using the following based on the measured mutual capacitive image and the low ground mass correction factor.

As discussed above, the above is only a few ways that may be used to calculate the good ground value(s), the low ground mass correction factor, and obtain the corrected image. Another mechanism may be performed as follows, rather than correcting each image, during use rather than calibration, a comparison between the measured values and the good ground values, and based on the comparison, a determination may be made whether a low ground mass state exists. If a low ground mass state exists, a correction factor may be calculated as discussed above.

FIGS. 5.1, 5.2, and 5.3 show example graphical diagrams of the capacitive measurements in accordance with one or more embodiments of the invention. FIGS. 5.1, 5.2, and 5.3 are for example purposes only and not intended to limit the scope of the invention.

Turning to FIG. 5.1, consider the scenario in which a single input object is placed in the middle of a sensing region of the input device. Specifically, a large input object is placed covering the area between the $14^{th}$ and $20^{th}$ sensor electrodes on first axis (503) and between the $9^{th}$ and $15^{th}$ electrodes on a second axis (505). FIG. 5.1 shows a graph of the good ground image (501) obtained from performing mutual capacitive sensing. Specifically, the mutual capacitive measurements at the various positions are shown on the third axis (507). As shown in FIG. 5.1, in the good ground environment, the mutual capacitive measurements clearly indicate the position of the input object in the sensing region. Specifically, the good ground image (501) shows the single plateau at the position of the input object.

FIG. 5.2 shows a graph of the low ground mass image (511) with the same single input object in the same position as FIG. 5.1. In FIG. 5.2, the input device is in a low ground mass environment, such as on a non-conductive insulated table. Specifically, like FIG. 5.1, the first axis (503) and the second axis (505) show positions of the sensing region corresponding to various electrodes while the mutual capacitive measurements are shown on the third axis (507). As shown in FIG. 5.2, in the low ground mass environment, the mutual capacitive measurements appear to indicate the presence of four small input objects as reflected by the four peaks along the third axis. If FIG. 5.2 were used directly, the input device may report incorrect positional information resulting in the host performing unintended actions.

FIG. 5.3 shows a graph of the corrected image (521) that is a correction of the low ground mass image of FIG. 5.2. Specifically, the same mutual capacitive measurements are used as in FIG. 5.2. However, the mutual capacitive measurements are corrected for in FIG. 5.3. Like FIGS. 5.1 and 5.2, the first axis (503) and the second axis (505) show positions of the sensing region corresponding to various electrodes while the mutual capacitive measurements are shown on the third axis (507). As shown in FIG. 5.3, even in the low ground mass environment, the corrected mutual capacitive measurements clearly indicate the position of the input object in the sensing region by having the single plateau at the position of the input object.

FIGS. 5.1, 5.2, and 5.3 are only an example. The size and shape of the sensing region, position of the input object, number of input objects, corrections applied to the measurements, types of measurements corrected, etc. may be different without departing from the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for an input device, the processing system comprising:
    a sensor circuitry configured to be coupled to a first plurality of sensor electrodes and a second plurality of sensor electrodes, the sensor circuitry configured to:
        acquire a first plurality of mutual capacitive measurements between the first plurality of sensor electrodes and the second plurality of sensor electrodes, and
        acquire a first plurality of absolute capacitive measurements of the first plurality of sensor electrodes and the second plurality of sensor electrodes; and
    a determination circuitry configured to:
        determine a first projection from the first plurality of mutual capacitive measurements and a first profile from the first plurality of absolute capacitive measurements,
            wherein determining the first projection comprises:
                for each sensor electrode of at least of a subset of the first plurality of sensor electrodes on a first axis, summing a subset of the first plurality of mutual capacitive measurements along the length of the sensor electrode to obtain a summed value for the sensor electrode, and
            wherein the first projection comprises the summed value for each of a least the subset of the first plurality of sensor electrodes, and
        determine a low ground mass correction factor based on a good ground value, the first projection, and the first profile.

2. The processing system of claim 1, wherein the determination circuitry is further configured to:
    acquire a first comparison between the first projection and the first profile,
    wherein determining the low ground mass correction factor is based on the good ground value and the first comparison.

3. The processing system of claim 2, wherein acquiring the first comparison and determining the low ground mass correction factor comprises calculating a ratio of the first projection and first profile.

4. The processing system of claim 1, wherein the first projection and the first profile are along a same axis of a same set of sensor electrodes in the first plurality of sensor electrodes and the second plurality of sensor electrodes.

5. The processing system of claim 4,
    wherein the determination circuitry is further configured to determine a second projection from the first plurality of mutual capacitive measurements, and wherein the second projection comprises adding mutual capacitive measurements along a first axis of the second plurality of electrodes.

6. The processing system of claim 5,
wherein the determination circuitry is further configured to determine a second profile from the first plurality of absolute capacitive measurements, and
wherein the second profile and the second projection are along the same axis of the same sensor electrodes.

7. The processing system of claim 6, wherein the first comparison is further based on the second projection and the second profile.

8. The processing system of claim 1, wherein the determination circuitry is further configured to determine positional information for an input object based on the first plurality of mutual capacitive measurements and the low ground mass correction coefficient.

9. The processing system of claim 1,
wherein the sensor circuitry is further configured to:
acquire, while the input device is in a good ground state, a second plurality of mutual capacitive measurements between the first plurality of sensor electrodes and second plurality of sensor electrodes, and
acquire, while the input device is in a good ground state, a second plurality of absolute capacitive measurements of the first plurality of sensor electrodes and the second plurality of sensor electrodes, and
wherein the determination circuitry configured to:
determine a second projection from the second plurality of mutual capacitive measurements and a second profile from the second plurality of absolute capacitive measurements, and
acquire the good ground value the second projection and the second profile.

10. An input device comprising:
a first plurality of sensor electrodes and a second plurality of sensor electrodes configured to sense input objects in a sensing region of the input device; and
a processing system configured to:
acquire a first plurality of mutual capacitive measurements between the first plurality of sensor electrodes and the second plurality of sensor electrodes,
acquire a first plurality of absolute capacitive measurements of the first plurality of sensor electrodes and the second plurality of sensor electrodes,
determine a first projection from the first plurality of mutual capacitive measurements and a first profile from the first plurality of absolute capacitive measurements,
wherein the first projection is determined by, at least:
for each sensor electrode of at least of a subset of the first plurality of sensor electrodes on a first axis, summing a subset of the first plurality of mutual capacitive measurements along the length of the sensor electrode to obtain a summed value for the sensor electrode, and
wherein the first projection comprises the summed value for each of a least the subset of the first plurality of sensor electrodes, and
determine a low ground mass correction factor based on a good ground value, the first projection, and the first profile.

11. The input device of claim 10, wherein the first projection and the first profile are along a same axis of a same set of sensor electrodes in the first plurality of sensor electrodes and the second plurality of sensor electrodes.

12. The input device of claim 11,
wherein the processing system is further configured to determine a second projection from the first plurality of mutual capacitive measurements, and
wherein the second projection comprises adding mutual capacitive measurements along a first axis of the second plurality of electrodes.

13. The input device of claim 12,
wherein the processing system is further configured to determine a second profile from the first plurality of absolute capacitive measurements, and
wherein the second profile and the second projection are along the same axis of the same sensor electrodes.

14. The input device of claim 13, wherein the first comparison is further based on the second projection and the second profile.

15. The input device of claim 10, wherein the processing system is further configured to determine positional information for an input object based on the first plurality of mutual capacitive measurements and the low ground mass correction coefficient.

16. A method for capacitive sensing of an input device, the method comprising:
acquiring a first plurality of mutual capacitive measurements between a first plurality of sensor electrodes and a second plurality of sensor electrodes;
acquiring a first plurality of absolute capacitive measurements of the first plurality of sensor electrodes and the second plurality of sensor electrodes;
determining a first projection from the first plurality of mutual capacitive measurements and a first profile from the first plurality of absolute capacitive measurements,
wherein determining the first projection comprises:
for each sensor electrode of at least of a subset of the first plurality of sensor electrodes on a first axis, summing a subset of the first plurality of mutual capacitive measurements along the length of the sensor electrode to obtain a summed value for the sensor electrode, and
wherein the first projection comprises the summed value for each of a least the subset of the first plurality of sensor electrodes;
determining a low ground mass correction factor based on a good ground value, the first projection, and the first profile;
determining positional information for an input object based on the first plurality of mutual capacitive measurements and the low ground mass correction coefficient; and
reporting the positional information.

17. The method of claim 16, further comprising:
acquiring, while the input device is in a good ground state, a second plurality of mutual capacitive measurements between the first plurality of sensor electrodes and second plurality of sensor electrodes;
acquiring, while the input device is in a good ground state, a second plurality of absolute capacitive measurements of the first plurality of sensor electrodes and the second plurality of sensor electrodes;
determining a second projection from the second plurality of mutual capacitive measurements and a second profile from the second plurality of absolute capacitive measurements; and
acquiring the good ground value, the second projection, and the second profile.

18. The method of claim 16, further comprising:
acquiring a first comparison between the first projection and the first profile, wherein determining the low ground mass correction factor is based on the good ground value and the first comparison.

* * * * *